US012678737B2

(12) United States Patent
Picard et al.

(10) Patent No.: US 12,678,737 B2
(45) Date of Patent: Jul. 14, 2026

(54) METHOD FOR CONVERTING OSMOTIC ENERGY INTO HYDRAULIC ENERGY AND FOR DESALINATION

(71) Applicants: UNIVERSITE GRENOBLE ALPES, Saint Martin d'Hères (FR); CENTRE NATIONAL DE LA RECHERCHE SCIENTIFIQUE, Paris (FR)

(72) Inventors: Cyril Picard, Saint Egrève (FR); Elisabeth Charlaix, St Julien-en-Champsaur (FR); William Chèvremont, Herve/Battice (BE)

(73) Assignees: UNIVERSITE GRENOBLE ALPES, Saint Martin d'Hères (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 311 days.

(21) Appl. No.: 18/567,115

(22) PCT Filed: Jun. 2, 2022

(86) PCT No.: PCT/FR2022/051040
§ 371 (c)(1),
(2) Date: Dec. 5, 2023

(87) PCT Pub. No.: WO2022/258912
PCT Pub. Date: Dec. 15, 2022

(65) Prior Publication Data
US 2024/0252985 A1 Aug. 1, 2024

(30) Foreign Application Priority Data

Jun. 8, 2021 (FR) ........................................ 2106005

(51) Int. Cl.
*B01D 61/00* (2006.01)
*B01D 69/02* (2006.01)
(Continued)

(52) U.S. Cl.
CPC ......... *B01D 61/0021* (2022.08); *B01D 69/02* (2013.01); *C02F 1/445* (2013.01);
(Continued)

(58) Field of Classification Search
CPC ............... B01D 61/0021; B01D 69/02; B01D 2325/027; B01D 2325/02831;
(Continued)

(56) References Cited

U.S. PATENT DOCUMENTS 4,781,837 A * 11/1988 Lefebvre ............... C13B 20/165
203/DIG. 17

FOREIGN PATENT DOCUMENTS

| KR | 20110097150 A | 8/2011 |
|---|---|---|
| WO | 8603135 A1 | 6/1986 |
| WO | 2016028135 A1 | 2/2016 |

OTHER PUBLICATIONS

International Search Report and Written Opinion dated Aug. 22, 2022 in corresponding application No. PCT/FR2022/051040; with English partial translation and partial machine translation (total 20 pages).

(Continued)

*Primary Examiner* — Ekandra S. Miller-Cruz
(74) *Attorney, Agent, or Firm* — Seckel IP, PLLC

(57) ABSTRACT

The method p1 for converting osmotic energy into hydraulic energy and the method p2 for desalination, include pressurisation/depressurisation and isochoric washing of an aqueous solution containing a salt in the presence of a selective hydrophobic nanoporous material of which the nanoporous volume within the material is only accessible to fresh water and which has a nanoporosity volume fraction ranging from 0.2 to 1 so as to convert osmotic energy into hydraulic energy or conversely to desalinate water, preferably sea water or brine.

20 Claims, 1 Drawing Sheet

(51) Int. Cl.
　　*C02F 1/44*　　　　(2023.01)
　　*C02F 103/08*　　　(2006.01)
　　*F03G 7/00*　　　　(2006.01)
(52) U.S. Cl.
　　CPC ........ *F03G 7/015* (2021.08); *B01D 2325/027*
　　　　(2013.01); *B01D 2325/02831* (2022.08); *B01D*
　　　　　　*2325/02832* (2022.08); *B01D 2325/38*
　　　　　　(2013.01); *C02F 2103/08* (2013.01); *C02F*
　　　　　　　　　　　　　　*2303/10* (2013.01)
(58) Field of Classification Search
　　CPC ...... B01D 2325/02832; B01D 2325/38; B01D
　　　　　　61/002; C02F 1/445; C02F 2103/08;
　　　　　　　　　　C02F 2303/10; F03G 7/015
　　USPC ......................................................... 210/650
　　See application file for complete search history.

(56) References Cited

OTHER PUBLICATIONS

Logan et al., "Membrane-Based Processes for Sustainable Power Generation Using Water", Nature, vol. 488, Aug. 16, 2012, pp. 313-319.
Achilli et al., "Pressure Retarded Osmosis: From the Vision of Sidney Loeb to the First Prototype Installation—Review", Desalination, vol. 261, 2010, pp. 205-211.

Han et al., "Progress in Polymer Science Progress in Pressure Retarded Osmosis ( PRO ) Membranes for Osmotic Power Generation", Progress in Polymer Science, vol. 51, 2015, pp. 1-27.
Siria et al., "New Avenues for the Large-Scale Harvesting of Blue Energy", Nature Reviews Chemistry, vol. 1, No. 91, 2017, pp. 1-10.
Picard, "Accumulateurs à Nanoporeux Lyophobes" ["Lyophobe Nanoporous Accumulators"], Techniques de l'Ingénieur [Engineer Techniques], No. RE 266 V1, May 10, 2017, pp. 1-26 (with English machine translation, total 53 pages).
Michelin-Jamois et al., "Giant Osmotic Pressure in the Forced Wetting of Hydrophobic Nanopores", Physical Review Letters, vol. 115, No. 058501, Jun. 23, 2015, pp. 1-4.
Brogioli, "Extracting Renewable Energy from a Salinity Difference Using a Capacitor", Physical Review Letters, vol. 103, No. 058501, Jul. 29, 2009, pp. 1-4.
Park et al., "Exceptional Chemical and Thermal Stability of Zeolitic Imidazolate Frameworks", Proceedings of the National Academy of Sciences, vol. 103, No. 27, Jul. 5, 2006, pp. 10186-10191.
Michelin-Jamois et al., "Giant Osmotic Pressure in the Forced Wetting of Hydrophobic Nanopores", Physical Review Letters, vol. 115, pp. xx (2015).
Gérard, "Technique d'intrusiométrie rapide pour l'étude expérimentale du mouillage dynamique et du transport de solutés dans des pores hydrophobes nanométriques" ["Technique of fast intrusiometry for experimental study of dynamic wetting and solute transport in nanometric hydrophobic pores"], dissertation at University of Grenoble Alpes, 2020, pp. 1-207 (with English machine translation, total 438 pages).

\* cited by examiner

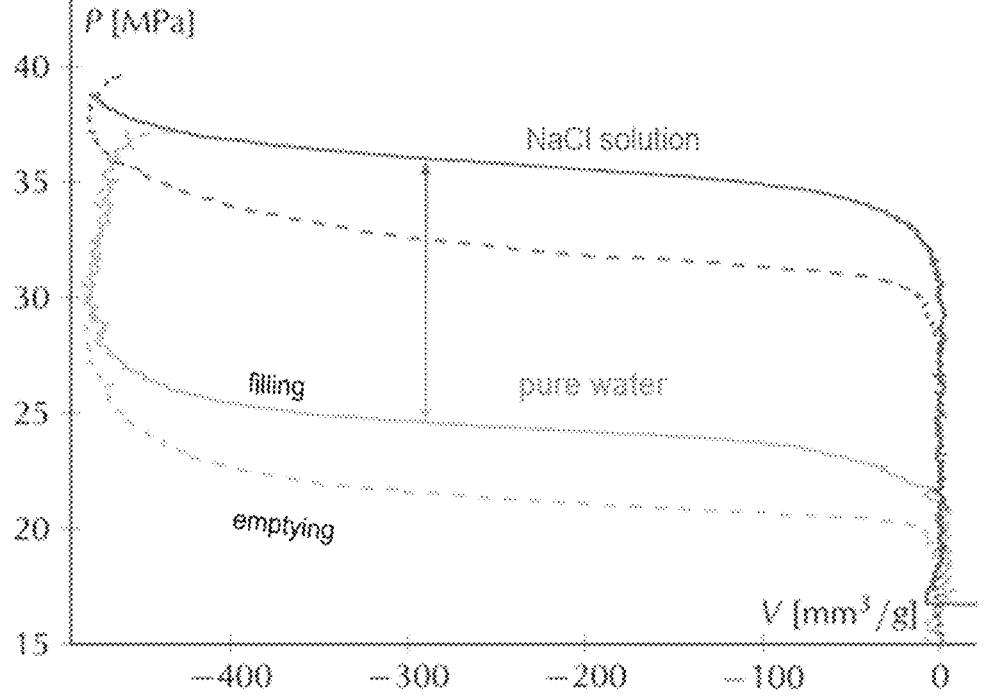

METHOD FOR CONVERTING OSMOTIC ENERGY INTO HYDRAULIC ENERGY AND FOR DESALINATION

TECHNICAL FIELD

The present invention belongs to the technical field of hydrophobic, ion-selective nanoporous powders in which the nanopore volume, within each grain of powder, is accessible only to fresh water, and in particular to the application of this principle for the conversion of osmotic energy into hydraulic energy, and of desalination of briny or sea water.

The present invention relates to a process P1 for converting osmotic energy into hydraulic energy and P2 for desalination, comprising steps of pressurization/depressurization and of isochoric washing of an aqueous solution comprising a salt in the presence of a selective hydrophobic nanoporous material whose nanopore volume within the material is accessible only to fresh water and which has a volume fraction of nanoporosity of from 0.2 to 1, preferably from 0.3 to 0.6, so as to convert the osmotic energy into hydraulic energy or, conversely, to desalinate water, preferably briny or sea water.

In the description, the references between parentheses ( )correspond to the list of references presented at the end of the examples.

PRIOR ART

Osmotic energy is an energy source associated with the difference in solute concentration between two liquids, such as salt ions, as for example between sea water and the fresh water in a river. The diverse approaches contemplated to date for recovering this energy are based essentially on the use of semipermeable membranes.

The production of electricity on the basis of osmotic energy has for more than 50 years represented a technological challenge, for achieving effective transportation of the water and not the salt ions (1). The strategies currently proposed are focused on the development of selective membranes which are permeable to water and not to the ions (2). In spite of large steps forward, the membranes currently available, based on polymer material, enable only limited power density (around 10 W/m² of membrane) and are not economically viable (3). The use of titanium oxide or boron nitride nanotube would enable an increase of several orders of magnitude in the power density, relative to the polymer materials; however, the possibility of employing them in membrane form remains to be demonstrated (4).

Separation between water and the salt ions, and the membrane approach, is not the only pathway that may be contemplated.

There is another approach, called "capmix" for capacitive mixing, which relies on an electrostatic charging/discharge cycle at the interface of porous materials immersed alternately into a solution poor or rich in ions (7). The capmix approach does away with the problem of permeability; the osmotic energy is converted directly into electricity, although to date the power density has remained minimal relative to the membrane approach.

The selective membranes employed in many filtration processes (for example, sea water desalination or dialysis) and more particularly for conversion of osmotic energy into useful (electrical or mechanical) energy have two major drawbacks for this latter application: firstly, a limited permeability to water, necessitating large membrane surface areas; secondly, a mediocre mechanical strength, so greatly limiting the difference in concentration between the two fluids employed and, consequently, the power density of the devices.

There is therefore a need to provide a solution which is unhampered by these two drawbacks linked to the membranes, but which also, unlike the capmix approach, is not limited by the electrokinetics at the interfaces.

DESCRIPTION OF THE INVENTION

The pathway employed in the present invention is reliant on the development of lyophobic heterogeneous systems, studied by a small scientific community, and based on the use of hydrophobic nanoporous powders. These systems have hitherto been contemplated for the storage of hydraulic energy by forced filling of each powder grain in water under high pressure, to counterbalance the hydrophobicity of the pores. This energy can be recovered on spontaneous expulsion of the liquid from the pores when the pressure is released (5).

An additional property of some of these powders is their selectivity, which in the presence of salt solution permits filling solely with pure water and to the exclusion of the salt ions outside the porosity. In the presence of salt, this selectivity leads to an increase in filling/emptying pressure, which is advantageous for increasing the hydraulic energy density stored (6). This selectivity, permitting separation between water and ions, is additionally of advantage, hitherto unconsidered, for the collection of osmotic energy that is associated with large differences in solute concentration— this is exploited in this invention.

Indeed, the salt-saturated brine in salt pans represents an osmotic pressure of 500 MPa, which is equivalent to a waterfall height of the order of 5 km.

The present invention aims to exploit this energy resource by means of a cycle based on filling/emptying of the powder in alternation with the liquid with which it is in contact. This operation in cycle form with alternation of liquids also removes the limits associated with direct conversion to electricity in the capmix process.

A subject of the invention is a process P1 for converting osmotic energy into hydraulic energy, comprising the following steps:

1a) contacting of an aqueous solution A comprising a salt preferably selected from alkali metal and/or alkaline earth metal salts, and a selective hydrophobic nanoporous material whose nanopore volume within the material is accessible only to fresh water and which has a volume fraction of nanoporosity of from 0.2 to 1, preferably from 0.3 to 0.6, 1b) pressurization of the mixture obtained in step 1a) to a pressure of from 10 to 1000 bar, preferably from 10 to 500 bar, and intrusion of water into the nanoporous material, 1c) isochoric washing of the pressurized mixture obtained in step 1b), the washing being carried out by means of an aqueous solution B comprising a salt preferably selected from alkali metal and/or alkaline earth metal salts, 1d) depressurization of the mixture washed in step 1c), expulsion of water from the nanoporous material, dilution of solution B and collection of hydraulic energy, characterized in that the salt concentration of solution B is greater than that of solution A, the difference in salt concentration between solution A and solution B being within a range from 0.5 to 25 mol/L.

Advantageously, solution B has a salt concentration of less than or equal to 25 mol/L.

Advantageously, solution A has a salt concentration of from 0 to 2 mol/L.

Advantageously, the salt is selected from alkali metal and/or alkaline earth metal salts. The salt in question may be a salt selected from lithium chloride LiCl, sodium chloride NaCl, potassium chloride KCl, cesium chloride CsCl, magnesium chloride $MgCl_2$, calcium chloride $CaCl_2$, barium chloride $BaCl_2$, lithium bromide LiBr, sodium bromide NaBr, magnesium bromide $MgBr_2$, calcium bromide $CaBr_2$, sodium iodide LiI, sodium iodide NaI, potassium iodide KI, magnesium iodide $MgI_2$, calcium iodide $CaI_2$ and mixtures thereof. The salt is preferably an alkali metal salt or mixture of alkali metal salts, preferably selected from alkali metal chlorides, preferably NaCl and/or LiCl.

The nature of the salts in solutions A and B may be identical or different.

Advantageously, the nanoporous material is a selective hydrophobic nanoporous material whose nanopore volume within the material is accessible only to fresh water. The phrase "selective . . . whose nanopore volume within the material is accessible only to fresh water" means that only the molecules of water can enter the nanomaterial. The salts, and more particularly the salts cited above, are filtered by the material. The nanoporous material may have a volume fraction of nanoporosity of from 0.2 to 1, preferably from 0.3 to 0.6. The volume fraction of nanoporosity refers to the ratio of the nanopore volume to the total volume of the material, the nanopore volume being measured by adsorption isotherm (8). The nanoporous material may take the form of a powder, agglomerated or unagglomerated, or a composite. When the material is in composite form, the powder may be trapped in a cellulose foam. The material in this form (powder or composite) is trapped in an enclosure such that the liquid (solution A or B) can enter and leave the enclosure without the solid being transported.

Advantageously, the nanoporous material may be selected from MOFs (metal-organic frameworks), zeolites, imogolites, mesoporous silicas, mesoporous organosilicon compounds and aerogels. The nanoporous material may preferably be selected from ZIF-8 (zeolitic imidazolate framework 8), Cu2(tebpz) (tebpz=3,3',5,5'-tetraethyl-4,4'-bipyrazolate), silicalite, chabazite and SSZ-24 (a purely silicic zeolite with the same AFI structure, where AFI=aluminophosphate-five).

Advantageously, the nanoporous material may have pores with a mean diameter of from 0.5 to 5 nm. For example, in the case of the material ZIF-8, the diameter of the pores is 1.2 nm. The diameter of the pores refers to the maximum diameter within the porous structure. The diameter of the pores may generally be determined theoretically from the crystallographic structure of the material, and by x-ray diffraction and adsorption isotherm measurements (8). In reference (8), the diffraction measurements are made using a Bruker AXS diffractometer, Madison, WI, and the adsorption isotherms are realized on a Quantachrome Autosorb-1C instrument with adsorption of dinitrogen and dihydrogen.

Advantageously, the nanoporous material may have constrictions with a mean diameter of 0.2 to 1 nm, preferably of from 0.2 nm to 0.5 nm. For example, in the case of the material ZIF-8, the diameter of the constrictions is 0.34 nm. Constrictions refer to the region of the pores in which the mean diameter is minimal within the porous structure. The mean diameter of the constrictions may generally be determined theoretically from the crystallographic structure of the material, and by x-ray diffraction and adsorption isotherm measurements (8). In reference (8), the diffraction measurements are made using a Bruker AXS diffractometer, Madison, WI, and the adsorption isotherms are realized on a Quantachrome Autosorb-1C instrument with adsorption of dinitrogen and dihydrogen.

A reaction medium is defined, the medium in which the nanoporous material undergoes the process. A ratio M (v/v) is defined for the volume of nanoporous material relative to the volume of the reaction medium. Advantageously, the ratio M (v/v) may have a value of from 0.2 to 1, preferably 0.7.

Advantageously, step 1a) of the process P1 according to the invention may be performed in a high-pressure cell or enclosure (reaction medium) such as a hydraulic accumulator whose volume may be situated within a range from 1 $cm^3$ to 100 $dm^3$. The cell may consist, for example, of a rigid cylindrical stainless steel base and a closure which comprises an elastomeric membrane. The internal dimensions of the cell may be, for example, 19 mm in diameter and 11 mm in height. The cell may comprise a preferably cylindrical reservoir. The reservoir is configured to be permeable to the liquid (solution A or B) but not to the nanoporous material, so that said material is not entrained during washing steps (9).

Advantageously, step 1b) of the process P1 according to the invention may be performed by means of a high-pressure device such as a hydraulic actuator. This may be, for example, the apparatus described in the text in reference (9). The duration of step 1b) may be situated within a range from 10 ms to 10 s and preferably from 100 ms to 1 s. The pressure applied in step 1b) depends on the structure and the chemical nature of the nanoporous material used and on the temperature at which step 1b) is performed, and on the composition of the solution employed (here solution A). For example, in the case of the material ZIF-8, a pressure of the order of 250 bar is sufficient for the filling of the pores (see FIG. 1) with pure water at a temperature of 25° C.

Advantageously, step 1c) of the process P1 according to the invention, 1c), is an isochoric washing of the pressurized mixture obtained in step 1b), the washing being carried out by means of an aqueous solution B comprising a salt preferably selected from alkali metal and/or alkaline earth metal salts. In step 1c), the solution A external to the nanoporous material is replaced by solution B. The washing is carried out under conditions such that the water trapped in the nanoporous material remains there. In the performance of step 1c) of the process P1 according to the invention, the pressure increases in the system at constant volume. This increase in pressure is due to the difference in salt concentration between the aqueous solutions A and B. The process P1 according to the invention may therefore comprise an increase in the pressure, during the washing step 1c). For example, on passage from a solution A at 0 mol/L to a solution B at 5.2 mol/L, the pressure increase during step 1c) is 405 bar at 25° C. For example, for infinitely low concentrations, the osmotic pressure Il is given by the Van't Hoff formula $\Pi = i\,c\,RT$, where c is the salt concentration, i is the number of ions contained in the salt, R is the ideal gas constant and T is the temperature; for the specific case of the salt NaCl at a temperature of 25° C., the following phenomenological law allows the osmotic pressure to be expressed irrespective of the concentration c of 0 to 6 mol/L: $\Pi = \Pi_o$ ln a(C), where the pressure $\Pi_o$=137 MPa and the activity a(C)=1−0.0256 C−0.0045 $C^2$. Step 1c) may be performed using a double-acting actuator with a through-type rod. A double-acting actuator with a through-type rod generally comprises a central piston which separates two chambers, one containing the solution B and the second the solution A.

On displacement of this piston, the volume of solution B injected into the cell is identical to the volume of solution A exiting the cell. Moreover, the two fluids are at quasi-identical pressure, since they are in contact within the cell (pressure difference situated within a range from 0 to 10 bar, necessary for the circulation of the liquid, between the cell entry and exit pressures). Washing takes place at a pressure equal to the sum of the pressure of emptying the material of pure water and the osmotic pressure of the solution in contact with the material at the temperature under consideration. For example, when solution B is an aqueous solution of NaCl at 5.2 mol/L at 25° C., washing commences at the pressure of filling with solution A of 250 bar, the sum of the pressure of 250 bar of filling the material ZIF-8 with pure water and the osmotic pressure of 0 bar of the solution A at zero concentration, and finishes at the pressure of filling with solution B of 655 bar, the sum of the pressure of 250 bar of filling the material ZIF-8 with pure water and the osmotic pressure of 405 bar of the solution B. The duration of step 1c) may be situated within a range from 10 ms to 10 s, preferably from 100 ms to 1 s.

Advantageously, step 1d) of the process P1 according to the invention may be performed by means of a high-pressure device such as a hydraulic actuator. This may be, for example, the apparatus described in the text (9). The duration of step 1d) may be situated within a range from 10 ms to 10 s and preferably from 100 ms to 1 s. The depressurization applied in step 1d) depends on the nanoporous material used, on the composition of the solution (here B) and on the temperature at which step 1d) is performed. In step 1d), the depressurization and the associated parameters are imposed by the concentration of the solution B, the nature of the nanoporous material and the temperature of performance of the process.

Advantageously, the process P1 according to the invention may further comprise a step 1e) of isochoric washing of the mixture obtained at the end of step 1d), the washing being carried out by means of an aqueous solution A. In the performance of step 1e) of the process P1 according to the invention, the pressure decreases in the system at constant volume. This decrease in pressure is due to the difference in salt concentration between the aqueous solutions B and A. The process P1 according to the invention may therefore comprise a decrease in the pressure, during the washing step 1e). For example, on passage from a solution B at 5.2 mol/L to a solution A at 0 mol/L, the pressure decrease during step 1e) is 405 bar at 25° C. For infinitely low concentrations, the decrease in pressure Il is given by the Van't Hoff formula $\Pi = i \Delta c$, where $\Delta c$ is the salt concentration, i is the number of ions contained in the salt, R is the ideal gas constant and T is the temperature; for the specific case of the salt NaCl at a temperature of 25° C., the following phenomenological law allows the osmotic pressure to be expressed irrespective of the concentration c of 0 to 6 mol/L: $\Pi = \Pi_o \ln a(C)$, where the pressure $\Pi_o = 137$ MPa and the activity $a(C) = 1 - 0.0256$ $C - 0.0045 C^2$. Step 1e) may be performed using a double-acting actuator with a through-type rod. A double-acting actuator with a through-type rod generally comprises a central piston which separates two chambers, one containing the solution A and the second the solution B. On displacement of this piston, the volume of solution A injected into the cell is identical to the volume of solution B exiting the cell. Moreover, the two fluids are at quasi-identical pressure, since they are in contact within the cell (pressure difference situated within a range from 0 to 10 bar, necessary for the circulation of the liquid). Washing takes place at a pressure equal to the sum of the pressure of emptying the material of pure water and the osmotic pressure of the solution in contact with the material at the temperature under consideration. For example, when solution B is an aqueous solution of NaCl at 5.2 mol/L at 25° C., washing commences at the pressure of emptying the solution B of 585 bar, the sum of the pressure of 180 bar of emptying the material ZIF-8 of pure water and the osmotic pressure of 405 bar of the solution B, and finishes at the pressure of emptying of solution A of 180 bar, the sum of the pressure of 180 bar of emptying the material ZIF-8 of pure water and the osmotic pressure of 0 bar of the solution A. The duration of step 1c) may be situated within a range from 10 ms to 10 s, preferably from 100 ms to 1 s.

Advantageously, the process according to the invention may further comprise a step 1f) of converting the hydraulic energy collected in step 1d) into mechanical or electrical energy. Step 1f) may be performed using a hydraulic motor or a turbine, either of which may be coupled to an AC generator.

Advantageously, the process according to the invention may be performed by a repetition of steps 1b), 1c), 1d), 1e) and optionally 1f). The process P1 may therefore be performed such that the successive steps are 1a), 1b), 1c), 1d), 1e), 1b), 1c), 1d), 1e), etc. Steps 1b), 1c), 1d), 1e) and optionally 1f) may be repeated a number n of iterations, n being an integer greater than or equal to 2. For example, in normal operation, for an enclosure (reaction medium) with a volume of 100 mL, a volume of water of 50 mL litres and a volume of ZIF-8 powder of 50 mL, the value of n may be of the order of a million.

Advantageously, the process according to the invention may be performed at a temperature of from 5 to 150° C., preferably from 20 to 70° C.

The invention also relates to a process P2 for desalinating a solution comprising a salt, preferably briny or sea water, comprising the following steps:

2a) contacting of an aqueous solution B comprising a salt preferably selected from alkali metal and/or alkaline earth metal salts, and a selective hydrophobic nanoporous material whose nanopore volume within the material is accessible only to fresh water and which has a volume fraction of nanoporosity of from 0.2 to 1, preferably from 0.3 to 0.6, 2b) pressurization of the mixture obtained in step 2a) to a pressure of from 10 to 1200 bar, preferably from 200 to 800 bar and more preferably 250 bar, and intrusion of water into the nanoporous material, 2c) isochoric washing of the pressurized mixture obtained in step 2b), the washing being carried out by means of an aqueous solution C, the aqueous solution C being pure water or fresh water, 2d) depressurization of the washed mixture obtained in step 2c), expulsion of water from the nanoporous material, dilution of solution C and collection of salt-depleted water.

"Collected salt-depleted water" refers to the mixture formed by solution C and the water retained in the material.

The definitions given above with regard to the nanoporous material, the salt, the aqueous solution B, the temperatures, the ratios, and all of the parameters relating to the apparatus, for the process P1 are applicable to the process P2.

Advantageously, step 2a) of the process P2 according to the invention may be performed in a high-pressure cell or enclosure (reaction medium) as described in the context of step 1a) of the process P1. The cell may comprise a preferably cylindrical reservoir. The reservoir is configured to be permeable to the liquid (solution B or C) but not to the nanoporous material, so that said material is not entrained during washing steps.

Advantageously, step 2b) of the process P2 according to the invention may be performed by means of a high-pressure device such as a hydraulic actuator. This may be, for example, the apparatus described in the text (9). The duration of step 2b) may be situated within a range from 10 ms to 10 s and preferably from 100 ms to 1 s. The pressure applied in step 2b) depends on the nanoporous material used, on the temperature at which step 1b) is performed and on the composition of the solution employed (here solution B). For example, in the case of the material ZIF-8, a pressure of the order of 655 bar is sufficient for the filling of the pores (see FIG. 1).

Advantageously, the performance of step 2c) of the process P2 is similar to that of step 1e) of the process P1, but conducted at the pressure of step 2b) of the process P2. Hence step 2c) of the process P2 according to the invention is an isochoric washing of the pressurized mixture obtained in step 2b), the washing being carried out by means of an aqueous solution C, the aqueous solution C being pure water or fresh water (for example, mains water or tap water). In step 2c), the solution B external to the nanoporous material is replaced by solution C. The washing is carried out under conditions such that the water trapped in the nanoporous material remains therein. In the performance of step 2c) of the process P2 according to the invention, the pressure decreases in the system at constant volume. This decrease in pressure is due to the difference in salt concentration between the aqueous solutions B and C. The process P2 according to the invention may therefore comprise a decrease in the pressure, during the washing step 2c). For example, on passage from a solution B at 5.2 mol/L to a salt-free solution C (or a solution C containing a low salt concentration, particularly when it is fresh water), the pressure decrease during step 2c) is 405 bar. For infinitely low concentrations, the decrease in pressure $\Pi$ is given by the Van't Hoff formula $\Pi = i \, \Delta c \, RT$, where $\Delta c$ is the salt concentration, i is the number of ions contained in the salt, R is the ideal gas constant and Tis the temperature; for the specific case of the salt NaCl at a temperature of 25° C., the following phenomenological law allows the osmotic pressure to be expressed irrespective of the concentration c of 0 to 6 mol/L: $\Pi = \Pi_o \, \ln a(C)$, where the pressure $\Pi_o = 137$ MPa and the activity $a(C) = 1 - 0.0256 \, C - 0.0045 \, C^2$. Step 2c) may be performed using a double-acting actuator with a through-type rod. A double-acting actuator with a through-type rod generally comprises a central piston which separates two chambers, one containing the solution B and the second the solution C. On displacement of this piston, the volume of solution C injected into the cell is identical to the volume of solution B exiting the cell. Moreover, the two fluids are at quasi-identical pressure, since they are in contact within the cell (pressure difference situated within a range from 0 to 10 bar, necessary for the circulation of the liquid). The pressure is equal to the sum of the pressure of emptying the material of pure water and the osmotic pressure of the solution in contact with the material at the temperature under consideration. For example, when solution B is an aqueous solution of NaCl at 5.2 mol/L at 25° C., washing commences at the pressure of emptying the solution B of 655 bar, the sum of the pressure of 250 bar of filling the material ZIF-8 with pure water and the osmotic pressure of 405 bar of the solution B, and finishes at the pressure of filling of solution C of 250 bar, the sum of the pressure of 250 bar of filling the material ZIF-8 with pure water and the osmotic pressure of 0 bar of the solution C. The duration of step 1c) may be situated within a range from 10 ms to 10 s and preferably from 100 ms to 1 s.

Advantageously, step 2d) of the process P2 according to the invention may be performed by means of a high-pressure device such as a hydraulic actuator. This may be, for example, the apparatus described in the text (9). The duration of step 2d) may be situated within a range from 10 ms to 10 s and preferably from 100 ms to 1 s. The depressurization applied in step 2d) depends on the nanoporous material used, on the composition of the solution (here C) and on the temperature at which step 2d) is performed. In step 2d), the depressurization and the associated parameters are imposed by the concentration of the solution C, the nature of the nanoporous material and the temperature of performance of the process. In step 2d) of the process P2 according to the invention, the pure water trapped in the nanoporous material is expelled and mixed into solution C. The process P2 has therefore made it possible to desalinate part of the solution B, by passing it into the material and then diluting it in solution C. In the context of the use of the process P2 for the desalination of a concentrated brine, the performance level of the process according to the invention is greater than that of a conventional membrane approach. More specifically, the extra energy cost relative to the minimal thermodynamic desalination cost remains modest relative to the extra cost inherent in the conventional membrane approaches.

Advantageously, the process P2 according to the invention may further comprise a step 2e) of isochoric washing of the mixture obtained at the end of step 2d), the washing being carried out by means of an aqueous solution B. The performance of step 2e) is similar to that of step 1c), but conducted at the pressure of step 1d). Advantageously, in the performance of step 2e) of the process P2 according to the invention, the pressure increases in the system, owing to the return of the solution C to the solution B, at constant volume. This increase in pressure is due to the difference in salt concentration between the aqueous solutions C and B. The process P2 according to the invention may therefore comprise an increase in the pressure, during the washing step 2e). For example, on passage from a solution C (containing no salt or virtually no salt) to a solution B at 5.2 mol/L, the pressure increase during step 2e') is 405 bar. For infinitely low concentrations, the increase in pressure $\Pi$ is given by the Van't Hoff formula $\Pi = i \, \Delta c \, RT$, where $\Delta c$ is the difference in salt concentration, i is the number of ions contained in the salt, R is the ideal gas constant and Tis the temperature; for the specific case of the salt NaCl at a temperature of 25° C., the following phenomenological law allows the osmotic pressure to be expressed irrespective of the concentration c of 0 to 6 mol/L: $\Pi = \Pi_o \, \ln a(C)$, where the pressure $\Pi_o = 137$ MPa and the activity $a(C) = 1 - 0.0256 \, C - 0.0045 \, C^2$. Step 2e) may be performed using a double-acting actuator with a through-type rod. A double-acting actuator with a through-type rod generally comprises a central piston which separates two chambers, one containing the solution C and the second the solution B. On displacement of this piston, the volume of solution B injected into the cell is identical to the volume of solution C exiting the cell. Moreover, the two fluids are at quasi-identical pressure, since they are in contact within the cell (pressure difference situated within a range from 0 to 10 bar, necessary for the circulation of the liquid, between the cell entry and exit pressures). Washing takes place at a pressure equal to the sum of the pressure of emptying the material of pure water and the osmotic pressure of the solution in contact with the material at the temperature under consideration. For example, when solution B is an aqueous solution of NaCl at 5.2 mol/L at 25° C., washing commences at the pressure of filling the solution C of 250 bar, the sum of the pressure of 250 bar of filling the material ZIF-8 with pure water and the osmotic pressure of 0 bar of the solution C, and finishes at the pressure of filling of solution B of 655 bar, the sum of the pressure of 250 bar of filling the material ZIF-8 with pure water and the osmotic pressure of 405 bar of the solution B. The duration of step 1c) may be situated within a range from 10 ms to 10 s and preferably from 100 ms to 1 s.

Advantageously, the process P2 according to the invention may be performed by a repetition of steps 2b), 2c), 2d) and 2e). The process P2 may therefore be performed such that the successive steps are: 2a), 2b), 2c), 2d), 2e), 2b), 2c), 2d), 2e), etc. Steps 2b), 2c), 2d) and 2e) may be repeated a number m of iterations, m being an integer greater than or equal to 2. For example, in normal operation, for an enclosure (reaction medium) with a volume of 100 mL, a volume of water of 50 mL litres and a volume of ZIF-8 powder of 50 mL, the value of m may be of the order of a million.

Without limitation, the processes P1 and P2 also exhibit the following advantages:

the processes P1 and P2 according to the invention can be performed in the same device;

the processes P1 and P2 operate by volume osmosis between the outside and the inside of the selective, hydrophobic nanoporous particles;

the processes P1 and P2 make use of the exchange surface area corresponding to the external surface area of the collective of nanoporous particles. This exchange surface area, set by the size of the nanoporous particles, is between 0.1 and 100 $m^2$/g. This exchange surface area enables rapid operation, with filling/emptying times of between 10 ms and 10 s and preferably between 100 ms and 1 s;

the processes P1 and P2 are based on an isotropic mechanical stressing of each nanoporous particle, which allows operation to take place in the presence of concentrated solutions having an osmotic pressure of possibly up to 1000 bar.

BRIEF DESCRIPTION OF THE FIGURES

FIG. 1 represents a filling/emptying cycle with pure water in ZIF-8 in the presence of a salt solution of NaCl at 2 mol/L at 70° C.

EXAMPLES

Example 1: Performance of the Process P1 According to the Invention

The process according to the invention is illustrated using a selective hydrophobic nanoporous material whose nanopore volume within the material is accessible only to fresh water: ZIF-8 (8).

This is a material of metal organic framework (MOF) type, consisting of zinc atoms bonded by organic ligands, and has a nanoporous structure in the form of spherical cages organized in a cubic structure. The pores of the ZIF-8 have a diameter of 1.2 nm. The cages (or pores) are interconnected by constrictions with a diameter of 0.34 nm. The nanoporous volume of this material represents a volume fraction of 0.4.

ZIF-8 is a hydrophobic material with low affinity for aqueous solutions. Filling and emptying of the available volume inside the nanoporous material take place under pressure (intrusion and expulsion of liquid into and out of the nanoporous material). At ambient temperature, the material fills with pure water at a quasi-constant pressure of the order of 250 bar, whereas emptying takes place for a pressure of the order of 180 bar. These pressures are dependent on the temperature, on the nature of the aqueous solution and, to a smaller extent, the duration of filling/emptying (see FIG. 1 and table 2).

In the presence of salt solution, since the salts are excluded from the available volume inside the nanoporous material, they do not penetrate into the hydrophobic nanoporous material. By osmotic effect, an increase is observed in the intrusion and expulsion pressure, as a function of the salt concentration (see FIG. 1) (9-10). It is this pressure gap which gives rise to the energy recoverable by the process according to the invention. For a solution of sodium chloride NaCl at saturation, i.e., 5.2 mol/L, at ambient temperature, a gap of 405 bar is observed toward high pressures: liquid intrusion occurs at 655 bar, and extrusion of the liquid at 585 bar.

The process is performed in a high-pressure cell suitable for studying phenomena of filling/emptying of hydrophobic nanoporous materials under high pressure. The cell consists of a rigid cylindrical stainless steel base and a closure which comprises an elastomeric membrane. When the cell has been filled, the variation in volume is provided by a piston which deforms the membrane, the latter allowing simultaneously the pressure integrity, the deformability of the system, and its imperviosity in dynamic regime, for piston velocities of 0 to 500 mm/s. The system as a whole is mounted on a traction machine, which is used for controlling the displacement of the piston. This hydraulic machine is able to deliver/dissipate the energy stored/recovered during filling/emptying phenomena for the material. In the context of an industrial application, this traction machine is replaced by a system for converting mechanical energy to electricity, for example.

The volume of the cell allows a cylindrical tank to be accommodated. One of the bases of the tank is closed by a microporous membrane which is permeable to the liquid but not to the ZIF-8 powder; the second base is closed by a deformable membrane. This tank comprises two hydraulic connections, which allow the liquid to be circulated and to be changed while retaining the powder inside the tank via the frit. When the tank is filled, it is placed within the cell and immersed in water which is intended for transmitting the pressure.

The examples below were carried out in a laboratory model comprising this tank, which has to be withdrawn from the cell for changes of liquid.

In an alternative version, the cell enables change of liquid in situ by means of high-pressure tapping ports, without demounting of the tank.

Solution A is pure water. Solution B is a briny water, having an NaCl concentration of 5.2 mol/L. The difference in NaCl concentration between solution A and solution B is therefore 5.2 mol/L.

The process is performed at 25° C.

Step 1a) is performed by placing 400 mg of ZIF-8 powder in a tank with a volume of 2.5 $cm^3$, and making up the volume with pure water (solution A). The tank thus filled is placed in the high-pressure cell, which is closed by the high-pressure cap (ratio M (v/v)=0.18).

Step 1b): The closed cell is pressurized by vertical displacement of the piston at an imposed velocity of 1 mm/s at ambient temperature. In the course of this displacement, the pressure, which increases within the cell, is transmitted to the liquid/powder collective contained in the tank, via the flexible membrane which closes the tank. The pressure increases initially by compression of the liquid and elastic deformation of the cell, to reach a pressure of 240 bar, which marks the start of the filling of the nanoporous material with liquid. This filling phenomenon is accomplished at a pressure of 260 bar. The filling lasts for 0.5 s, represents a change in volume of 160 mm$^3$, and operates at an average pressure of 250 bar. This pressure is independent of the quantity of powder: for twice the quantity placed in the tank, for a given piston velocity, the duration of filling is doubled, but the filling pressure range (240-260 bar) remains identical. The energy associated with the phenomenon of transfer of 160 mm$^3$ at 250 bar is 4 J; the corresponding mechanical power for filling in 0.5 s is 8 W.

Step 1c) requires the liquid to be changed under pressure so as to keep the fresh water in the nanoporosity. This step was not carried out as such in the laboratory model. The washing step 1c) was performed by withdrawing the tank from the cell, thus imposing a return to ambient pressure, and thus emergence of the liquid from the nanoporosity and hence breakage of the cycle. This operation does not allow the osmotic energy to be converted into hydraulic energy, but makes it possible to evaluate the energy recoverable in an operation without breakage of the cycle, by isochoric washing under pressure.

For the performance of step 1c), without breakage of the cycle, the isochoric washing under pressure is carried out using a double-acting solenoid actuator. The double-acting actuator comprises a central piston which separates two chambers, one containing brine (solution B) and the second the liquid from the device (solution A). On displacement of this piston, the volume of solution B injected into the cell is identical to the volume of solution A exiting the cell. Moreover, the two fluids are at quasi-identical pressure (except for the slight difference in pressure needed for displacement of the piston), since they are in contact within the cell: they both go from 250 to 650 bar, the pressure level being set by the difference in concentration between the fresh water held in the nanoporous material and the liquid contained in the cell, with a concentration which increases on displacement of the piston.

The washing procedure, when implemented under pressure, therefore represents only minimal consumption of energy. Throughout the duration of step 1c), the piston controlling the volume of the cell is held in a fixed position, corresponding to a compressed state of the system.

Step 1d) is carried out by depressurization of the system. The piston is released and moves out of the cell. The movement takes place at a pressure imposed by the phenomenon of the emptying of the water from the nanoporous material at the pressure of 580 bar at ambient temperature.

In experiments carried out for this example, the velocity of the piston is imposed by the traction machine— for example, 1 mm/s in the opposite direction to that of step 1b). The energy associated with the expulsion of the 160 mm$^3$ of liquid from the nanoporosity (for 400 mg of powder) at a pressure of 580 bar is 9.3 J and corresponds to a motive power of 18 W. The net energy extracted over the course of the cycle corresponds to the difference between the energy stored in step 1b) and the energy recovered in step 1d), i.e., 10 J.

The energy extracted over the course of the cycle is set by the difference in pressure between steps 1d and 1b multiplied by the change in volume associated with filling and emptying, in other words the available volume within the nanoporous material.

Accordingly, for 1 kg of ZIF-8, the nanopore volume is of the order of 0.4 L. Taking account of the pressure difference of 330 bar, an energy of 13 kJ is obtained. The difference in pressure recovered of 330 bar is less than the 400 bar of osmotic pressure, owing to the hysteresis between filling and emptying, corresponding to an 18% loss of energy.

This loss of energy can be minimized greatly by increasing the operating temperature (see example 2).

An additional advantage of the process is that the pressures are quasi-constant for filling/emptying times of greater than 0.1 s, allowing steps 1b) and 1d) to be carried out rapidly without additional loss of energy (see table 2). This aspect constitutes a notable advantage of the process according to the invention relative to conventional use of selective membranes for processes for converting osmotic energy, with which the pressure loss increases linearly with the liquid flow rate (that is, inversely to the passage time).

Taking into account the distance between powder grains, of the order of a micron, the transfer of fluid during washing phases (steps 1c and 1e) can take place over a duration of 0.5 s (identical to the duration of phases 1b and 1d) and requires a pressure difference of a few bar, which is modest when set against the difference in osmotic pressure.

The average power delivered with the process can be estimated by dividing the energy collected during a cycle by the duration of a cycle. Taking a value of 0.5 s per step of the cycle, the total duration of a cycle is 2 s. Accordingly, from the 13 KJ obtained for a saturated NaCl brine, at ambient temperature, in the context of this example a power of 6.4 KW is obtained for 1 kg of ZIF-8.

TABLE 1

| [NaCl]$_A$ mol/L | [NaCl]$_B$ mol/L | P$_{osm}$ bar | P$_{int}$ bar | P$_{ext}$ bar | P$_{ext}$ – P$_{int}$ bar | E$_{ext}$ kJ/L | E$_{tot}$ kJ/L | η |
|---|---|---|---|---|---|---|---|---|
| 0 | 0 | 0 | 250 | 180 | −65 | −6.5 | 0 | |
| 0 | 0.5 | 22 | 250 | 202 | −43 | −4.3 | 2.2 | |
| 0 | 1 | 46 | 250 | 226 | −19 | −1.9 | 4.6 | |
| 0 | 2 | 105 | 250 | 285 | 40 | 4 | 10.5 | 0.38 |
| 0 | 4 | 268 | 250 | 448 | 203 | 20.3 | 26.8 | 0.75 |
| 0 | 5.2 | 405 | 250 | 585 | 340 | 34 | 40.5 | 0.83 |

Table 1: Energy extracted at 25° C. as a function of the concentrations of solutions A and B. [NaCl]A NaCl concentration of solution A, [NaCl]B NaCl concentration of solution B, P$_{osm}$ osmotic pressure induced by the concentration difference, P$_{int}$ intrusion pressure, P$_{ext}$ expulsion pressure, P$_{ext}$-P$_{int}$ difference between intrusion pressure and expulsion pressure, E$_{ext}$ energy extracted per unit volume of liquid expelled, E$_{tot}$ total energy of osmotic origin per unit volume of liquid expelled, n yield of the conversion procedure.

Example 2: Study of the Effect of Temperature on Process Yield

Example 1 above is reproduced at different temperatures. The process is performed successively at the temperatures of 5, 15, 30, 50 and 70° C.

TABLE 2

| T ° C. | P$_{osm}$ bar | P$_{int}$ bars | P$_{ext}$ bar | P$_{ext}$ – P$_{int}$ bar | E$_{ext}$ kJ/L | E$_{tot}$ kJ/L | η |
|---|---|---|---|---|---|---|---|
| 5 | 384 | 230 | 534 | 304 | 30.4 | 38.4 | 0.79 |
| 15 | 398 | 235 | 568 | 333 | 33.3 | 39.8 | 0.83 |
| 30 | 418 | 250 | 613 | 363 | 36.3 | 41.8 | 0.86 |
| 50 | 446 | 255 | 651 | 396 | 39.6 | 44.6 | 0.88 |
| 70 | 474 | 260 | 694 | 434 | 43.4 | 47.4 | 0.92 |

Table 2: Energy extracted as a function of temperature for a solution A at 0 mol/L and a solution B at 5.2 mol/L. $P_{osm}$ osmotic pressure induced by the concentration difference, $P_{int}$ intrusion pressure, $P_{ext}$ expulsion pressure, $P_{ext}$-$P_{int}$ difference between intrusion pressure and expulsion pressure, $E_{ext}$ energy extracted per unit volume of liquid expelled, $E_{tot}$ total energy of osmotic origin per unit volume of liquid expelled, n yield of the conversion procedure.

A reduction in the difference between filling pressure and emptying pressure was observed when the temperature increases. As indicated in table 2, this temperature dependence impacts the dynamic behavior of the system. For a temperature greater than 50° C., the filling pressure becomes quasi-independent of the filling duration over the time range surveyed.

Operation at 70° C. leads to an increase in emptying pressure, which goes from 180 to 220 bar for pure water, while the filling pressure goes from 250 bar to 260 bar.

At 70° C., the difference in osmotic pressure is 474 bar. This gives a filling pressure of 260 bar, an emptying pressure of 694 bar, and thus an energy loss reduced to 8%.

LIST OF REFERENCES (1). Logan, Bruce E, and Menachem Elimelech. "Membrane-Based Processes for Sustainable Power Generation Using Water." Nature 488, No. 7411 (Aug. 16, 2012): 313-19. doi:10.1038/nature11477.

(2). Achilli, Andrea, and Amy E. Childress. "Pressure Retarded Osmosis: From the Vision of Sidney Loeb to the First Prototype Installation—Review." Desalination 261, No. 3 (October 2010): 205-11. doi:10.1016/j.desal.2010.06.017.

(3). Han, Gang, Sui Zhang, Xue Li, and Tai-shung Chung. "Progress in Polymer Science Progress in Pressure Retarded Osmosis (PRO) Membranes for Osmotic Power Generation." Progress in Polymer Science 51 (2015): 1-27. doi:10.1016/j.progpolymsci.2015.04.005.

(4). Siria, Alessandro, Marie-Laure Bocquet, and Lyderic Bocquet. "New Avenues for the Large-Scale Harvesting of Blue Energy." Nature Reviews Chemistry 1 (2017): 91. doi:10.1038/s41570-017-0091.

(5). Picard, Cyril. "Accumulateurs à Nanoporeux Lyophobes." Techniques de l'Ingénieur, No. RE 266 (2017).

(6). Michelin-Jamois, Millan, Cyril Picard, Gerard Vigier, and Elisabeth Charlaix. "Giant Osmotic Pressure in the Forced Wetting of Hydrophobic Nanopores." Physical Review Letters 115 (2015): 036101. doi:10.1103/PhysRevLett.115.036101.

(7). Brogioli, Doriano. "Extracting Renewable Energy from a Salinity Difference Using a Capacitor." Physical Review Letters 103, No. 058501 (2009): 1-4. doi:10.1103/PhysRevLett. 103.058501.

(8). Park, Kyo Sung, Zheng Ni, Adrien P Côté, Jae Yong Choi, Rudan Huang, Fernando J Uribe-Romo, Hee K Chae, Michael O'Keeffe, and Omar M Yaghi. "Exceptional Chemical and Thermal Stability of Zeolitic Imidazolate Frameworks." Proceedings of the National Academy of Sciences 103, No. 27 (2006): 8-13.

(10). V. Gérard. Technique d'intrusiométrie rapide pour l'étude expérimentale du mouillage dynamique et du transport de solutés dans des pores hydrophobes nanométriques, dissertation at University of Grenoble Alpes, (2020).

The invention claimed is:

1. A process for converting osmotic energy into hydraulic energy, comprising:
   1a) contacting (i) a first aqueous solution comprising a salt, and (ii) a selective hydrophobic nanoporous material having a nanopore volume within the material accessible only to fresh water and having a volume fraction of nanoporosity in a range from 0.2 to 1, to obtain a mixture,
   1b) pressurizing the mixture to a pressure in a range from 10 to 1000 bar, wherein water intrudes into the nanoporous material, to obtain a pressurized mixture,
   1c) carrying out a first isochoric washing of the pressurized mixture using a second aqueous solution comprising a salt, to obtain a washed mixture, and
   1d) depressurizing the washed mixture, wherein water is expulsed from the nanoporous material, diluting the second aqueous solution, and collecting hydraulic energy,
   wherein the first aqueous solution has a first salt concentration and the second aqueous solution has a second salt concentration greater than the first salt concentration, by a difference in a range from 0.5 to 25 mol/L.

2. The process as claimed in claim 1, wherein the second salt concentration is less than or equal to 25 mol/L.

3. The process as claimed in claim 1, wherein the first salt concentration is in a range from 0 to 2 mol/L.

4. The process as claimed in claim 1, wherein the nanoporous material is selected from the group consisting of metal organic framework (MOFs), zeolites, imogolites, mesoporous silicas, mesoporous organosilicon compounds and aerogels.

5. The process as claimed in claim 1, wherein the nanoporous material has pores having a mean diameter in a range from 0.5 to 5 nm.

6. The process as claimed in claim 1, wherein the nanoporous material has constrictions having a mean diameter in a range from 0.2 to 1 nm.

7. The process as claimed in claim 1, wherein the nanoporous material has a first volume and the reaction medium has a second volume wherein the first volume relative to the second volume represents a ratio (v/v) in a range from 0.2 to 1.

8. The process as claimed in claim 1, further comprising 1e) carrying out a second isochoric washing of the mixture obtained at the end of the depressurizing, diluting, and collecting 1d) using the first aqueous solution.

9. The process as claimed in claim 1, further comprising converting the hydraulic energy collected in the collecting 1d) into mechanical or electrical energy.

10. The process as claimed in claim 8, wherein the pressurizing 1b), the first isochoric washing 1c), the depressurizing, diluting, and collecting 1d), and the second isochoric washing 1e) are repeated a number n of iterations, n being an integer greater than or equal to 2.

11. The process as claimed in claim 1, wherein the process is performed at a temperature in a range from 5 to 150° C.

12. A process for desalinating a solution comprising a salt, comprising:
   2a) contacting (i) a first aqueous solution comprising a salt, and (ii) a selective hydrophobic nanoporous material having a nanopore volume within the material accessible only to fresh water and having a volume fraction of nanoporosity in a range from 0.2 to 1, to obtain a mixture,
   2b) pressurizing the mixture to a pressure in a range from 10 to 1200 bar, wherein water intrudes into the nanoporous material, to obtain a pressurized mixture,
   2c) carrying out a first isochoric washing of the pressurized mixture using a third second aqueous solution, the second aqueous solution being pure water or fresh water, to obtain a washed mixture, and 2d) depressurizing the washed mixture, wherein water is expulsed from the nanoporous material, diluting the second aqueous solution, and collecting salt-depleted water.

13. The process as claimed in claim 12, further comprising 2e) carrying out a second isochoric washing of the washed mixture obtained at the end of the depressurizing, diluting, and collecting 2d), the second isochoric washing being carried out using the first aqueous solution.

14. The process as claimed in claim 13, wherein the pressurizing 2b), the first isochoric washing 2c), the depressurizing, diluting and collecting 2d) and the second isochoric washing 2e) are repeated a number m of iterations, m being an integer greater than or equal to 2.

15. The process as claimed in claim 12, wherein, in the contacting 2a), the volume fraction of nanoporosity of the selective hydrophobic nanoporous material is in a range from 0.3 to 0.6.

16. The process as claimed in claim 12, wherein, in the pressurizing 2b), the mixture is pressurized to a pressure in a range from 200 to 800 bar.

17. The process as claimed in claim 1, wherein, in the contacting 1a), the volume fraction of nanoporosity of the selective hydrophobic nanoporous material in a range from 0.3 to 0.6.

18. The process as claimed in claim 1, wherein, in the pressurizing 1b), the mixture is pressurized to a pressure in a range from 10 to 500 bar.

19. The process as claimed in claim 1, wherein, in the first isochoric washing 1c), the second aqueous solution comprises the salt selected from alkali metal or alkaline earth metal salts or a combination thereof.

20. The process as claimed in claim 1, wherein the nanoporous material is selected from the group consisting of zeolitic imidazolate framework 8 (ZIF-8), Cu2(3,3',5,5'-tetraethyl-4,4'-bipyrazolate (Cu2 (tebpz)), silicalite, chabazite and silicic zeolite with aluminophosphate-five (SSZ-24).

* * * * *